(No Model.)
P. N. SWANSON.
FOLDING GAMBREL.
No. 554,549. Patented Feb. 11, 1896.
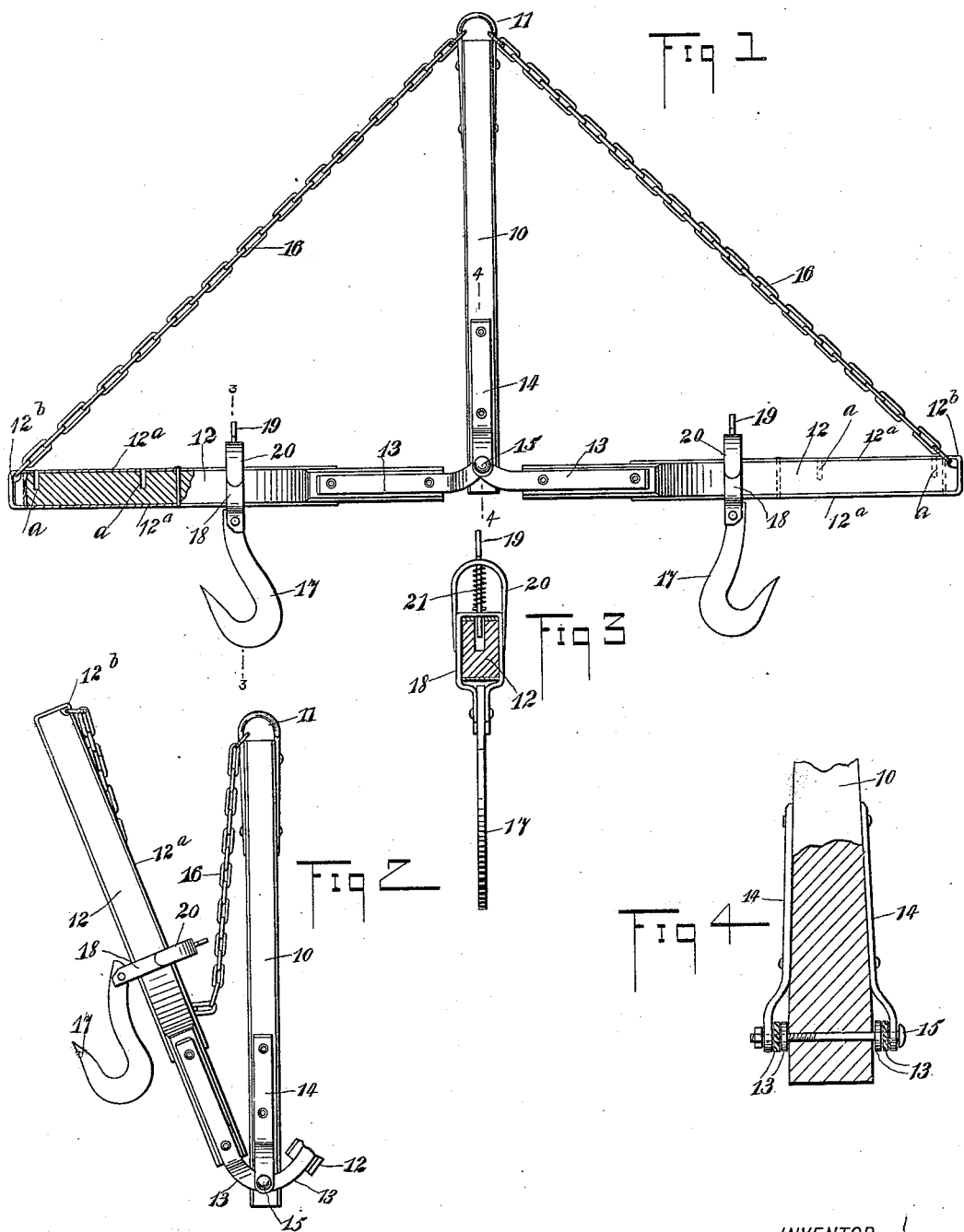
WITNESSES:
INVENTOR
P. N. Swanson
BY
Munn & Co.
ATTORNEYS.

UNITED STATES PATENT OFFICE.

PETER N. SWANSON, OF GALVA, ILLINOIS, ASSIGNOR OF ONE-THIRD TO EDWARD ANDERSON, OF SAME PLACE.

FOLDING GAMBREL.

SPECIFICATION forming part of Letters Patent No. 554,549, dated February 11, 1896.

Application filed June 27, 1895. Serial No. 554,240. (No model.)

*To all whom it may concern:*

Be it known that I, PETER N. SWANSON, of Galva, in the county of Henry and State of Illinois, have invented a new and Improved Folding Gambrel, of which the following is a full, clear, and exact description.

This invention relates to a novel folding gambrel for the suspension of a carcass of dressed beef, and is also applicable for hanging dressed hogs and sheep.

The objects of the invention are to provide a device of the indicated character which is adjustable in portions from which the dead animal is to be suspended, and from its peculiar construction is adapted to facilitate the separation of the whole carcass of a beef, hog or sheep into halves, which is necessary in the preparation of the dressed meat for use or sale.

Usually the means for suspending dressed dead animals—such as a beef, hog or sheep—from a beam or other overhead support to facilitate a division of the dressed animal into halves, is in the form of a stout stick of wood or bar of metal, having hooks or other provision at its ends for engaging the tendons of the legs at or near their hock-joints, so as to effect the spreading of the hind legs of the carcass and enable its suspension by an engagement of the gambrel-stick with a projection, such as a hook, on an overhead bar or beam.

The object of my invention is to provide a gambrel which will by its construction adapt the weight of the suspended carcass to effect the spreading of the hind legs thereof, and thus greatly aid the operation of cutting apart said carcass at the center of the joints of the spine, dividing the same into halves, which when so divided will hang completely separated for individual removal from the gambrel.

The invention consists in the construction and combination of parts, as hereinafter described and indicated in the claims.

Reference is to be had to the accompanying drawings, forming a part of this specification, in which similar characters of reference indicate corresponding parts in all the views.

Figure 1 is a side view of the device, showing hinged parts spread to their fullest extent. Fig. 2 is a side view of a half portion of the gambrel in folded condition. Fig. 3 is a transverse sectional view of a portion of the gambrel substantially on the line 3 3 in Fig. 1, and Fig. 4 is a transverse sectional view substantially on the line 4 4 in Fig. 1.

The improved gambrel comprises a substantial hanger-bar 10 of wood or metal. As shown said bar is represented as made of wood. At the normally upper end of the hanger-bar the loop-bent metal strap 11 is made to embrace the body of the hanger-bar with its spaced limbs, which are bolted to the bar or otherwise secured thereto. If the hanger-bar is formed of metal the hanger-loop 11 may be dispensed with and an eye perforation can be produced in the end of the bar for its suspension from any fixed overhead support by a hook, chain or rope.

On the lower end of the hanger-bar two similar arms 12 are hinged, preferably by means of two pairs of strong joint-plates 13 and another pair of joint-plates, 14. The latter-named plates are secured on opposite sides of the hanger-bar 10 near its lower end, having their lower portions outwardly and downwardly bent to afford space between each plate 14 and the side of the bar 10 for the introduction of the lapped ends of the joint-plates 13, that in pairs are oppositely bolted to the ends of the arms 12, which when the parts are assembled are to be held near to but not in contact with the hanger-bar. To this end the pairs of joint-plates 13 are each slightly curved edgewise, as shown in Figs. 1 and 2, and these edge-curved portions are projected beyond the ends of the arms 12 to have a lapped engagement with each other and for insertion between the lower ends of the plates 14, to which said ends of the plates 13 are pivoted by a transverse bolt 15, as plainly shown in Fig. 4. It will be seen in Fig. 2 that the incurved upper edges of the ends of the joint-plates 13 adapt the arms 12 to fold upwardly and near to the hanger-bar 10, which is essential for the efficient action of the gambrel.

The outer ends of the arms 12 are connected with the upper end of the hanger-bar 10 by flexible connections of equal length, which may be ropes or chains 16, the latter being shown in the drawings. If the arms 12 are made of wood they are preferably reinforced by metal bands 12ª, which are return-bent to form loops 12ᵇ at the outer ends of the arms, and when secured thereon, as shown in Figs. 1 and 2, said looped portions afford reliable means for attaching one end of each chain thereto, the opposite ends of the chains being secured to the hanger-loop 11. Each arm 12 is provided with a slidable hook that is preferably constructed as shown, comprising a hook-bent body 17, connected by a pivot to a suspension-strap 18, the latter being adapted to loosely embrace the arm.

A suitable number of spaced pin-holes $a$ are formed in the body of each arm 12, extending from its upper side at right angles thereto, these perforations being adapted individually to receive a spring-pressed keeper-pin 19, as clearly shown in Fig. 3. There is one of the pins 19 for each of the pair of hooks 17, held in position on the suspension-strap 18 by a yoke-plate 20. Said yoke-plates are arched pieces having their limbs secured on the parts 18, and are perforated in alignment with the pin-holes $a$, so that the springs 21, located on the pins between the yoke-plates and straps 18 and compressed by engaging a collar or cross-pin on each pin 19, are by their expansive force adapted to normally press their portions that pass through holes in the upper sides of the straps 18 down into the pin-holes $a$, and thus lock the hooks 17 at equal distances on the arms 12 from the hanger-bar 10.

In operation, assuming that the improved gambrel is hung from a fixed support at a proper distance from the ground or a room floor and it is desired to suspend a whole carcass of, say, a dressed beef on said gambrel for separation into halves, the dead animal is lifted and the arms 12 are upwardly rocked, so that the hooks 17 may be readily engaged with the tendons of the hind legs of the carcass, said hooks having been previously adjusted to locate them an equal and proper distance from the hanger-bar 10.

It will be seen that the weight of the carcass hung from the hooks will draw down on the arms 12, which by their outward rocking movement will spread the hind legs of the animal as far as permissible and tend to further spread them. The butcher with a cleaver or other suitable implement now cuts the spine from the root of the tail downwardly, equally separating the vertebræ. As the work of splitting apart the spine of the dressed animal is continued its weight will draw down on the arms 12, and as they approach a horizontal plane the partly-separated halves of the carcass will be kept under tensional strain, which greatly aids the operator in splitting the carcass into halves. After the carcass is divided, as explained, the two halves of the same will hang separated on the hooks 17, and each half of the animal may be removed from the gambrel without allowing the other half of the same to be lowered to any considerable extent.

The improvement is equally as available for suspension of hogs, sheep or lambs as it is for dressed beeves. It only requires that a proper adjustment of the movable hooks 17 be made to permit large or smaller dressed animals to be cut into halves as may be required to prepare the same for market or further subdivision for use as food supply.

By using the improved gambrel in large slaughter-houses the work of cutting up dressed dead animals is greatly facilitated, and after the animals are successively separated into halves while hanging from the gambrel the said halves of beeves, hogs or sheep may be transferred to overhead trolleys for transportation to cold-storage rooms, as is now the approved practice for preserving freshly-killed cattle, hogs or sheep.

Having thus described my invention, I claim as new and desire to secure by Letters Patent—

1. A gambrel, having hinged arms, and hooks adjustable on said arms for engaging and spreading the legs of a carcass hung on said hooks, substantially as described.

2. A gambrel, comprising a hanger-bar adapted for suspension from a support, two outwardly-movable arms on the bar, flexible connections between the bar and arms, and hooks adjustable on said bars, substantially as described.

3. A gambrel, comprising a hanger-bar having an eyehole at its normally upper end, two arms hinged to the lower end of the bar, stay chains or ropes connecting the ends of the hanger-bar, and movable hooks on the arms, each having a locking device for holding it adjustably secured on the arm, substantially as described.

4. A gambrel, consisting of a hanger-bar, two arms hinged to the lower end of the bar and provided with sockets in one face, ropes or chains connecting the outer ends of the arms with the upper end of the hanger-bar, suspension-straps fitted to slide on the arms and provided with spring-pressed pins adapted to enter the sockets of the arms, and hooks pivoted to the said straps, substantially as herein shown and described.

PETER N. SWANSON.

Witnesses:
N. F. ANDERSON,
ELMER E. FITCH.